United States Patent [19]

Wilkinson

[11] Patent Number: 4,644,252
[45] Date of Patent: Feb. 17, 1987

[54] NOISE ISOLATOR CIRCUIT FOR POWER SUPPLY FAN

[75] Inventor: Bruce L. Wilkinson, Torrance, Calif.
[73] Assignee: Pioneer Magnetics, Inc., Santa Monica, Calif.
[21] Appl. No.: 809,033
[22] Filed: Dec. 16, 1985
[51] Int. Cl.$^4$ ............................................. G05F 1/40
[52] U.S. Cl. ........................................ 323/273; 361/18
[58] Field of Search ............... 323/312, 273; 318/317;
   307/11; 363/141; 361/18, 98, 111; 330/207 P, 298

[56] References Cited

U.S. PATENT DOCUMENTS

| | | | |
|---|---|---|---|
| 3,551,745 | 12/1970 | Nicholas | 361/18 X |
| 3,809,999 | 5/1974 | Smith | 361/18 X |
| 3,916,294 | 10/1975 | Kennedy | 361/18 X |
| 4,435,678 | 3/1984 | Joseph et al. | 323/273 |
| 4,459,630 | 7/1984 | Beck | 361/18 |
| 4,475,077 | 10/1984 | Nagano | 323/312 |

Primary Examiner—Peter S. Wong
Assistant Examiner—Marc S. Hoff
Attorney, Agent, or Firm—Keith D. Beecher

[57] ABSTRACT

An isolation circuit for preventing the current surges drawn by a direct current cooling fan from appearing in the output of the power supply. The fan has one terminal connected to one terminal of the power supply, and a regulator circuit connects the other terminal of the fan to the other terminal of the power supply. The regulator circuit includes a capacitor connected across the fan to provide a low impedance circulating path for the current surges, and it also includes a network which provides a constant current to the parallel combination of the fan and capacitor.

4 Claims, 2 Drawing Figures

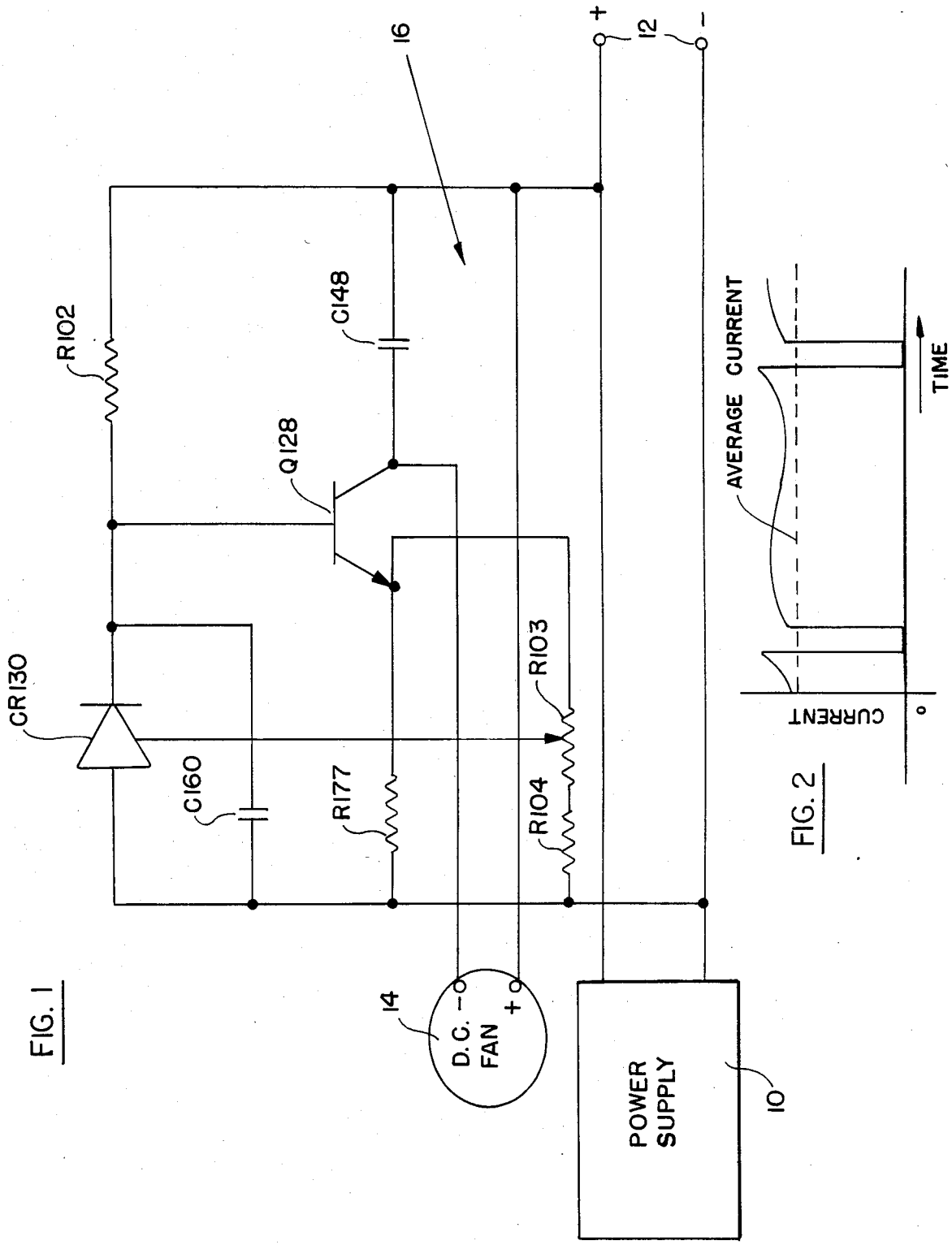

NOISE ISOLATOR CIRCUIT FOR POWER SUPPLY FAN

BACKGROUND OF THE INVENTION

It is the usual practice to provide cooling fans in direct current power supplies. Such cooling fans are usually of the direct current type, and are energized directly by the power supply. Direct current fan motors have a tendency to draw surges of current which occur roughly at twice the RPM of the fan. If such current surges appear in the output of the power supply, they can create noise signals within the audio band. These noise signals become troublesome, especially when the power supplies are used to energize telemetry systems, and the like.

Accordingly, it is an objective of the present invention to provide an isolation circuit which effectively provides a constant current source for the fan motor, and effectively prevents the fan motor from introducing noise signals into the output of the power supply.

BRIEF DESCRIPTION OF THE DRAWING

FIG. 1 is a circuit diagram showing the manner in which a direct current fan is energized by a power supply through an isolation circuit incorporating the concepts of the present invention; and FIG. 2 is a graph useful in explaining the operation of the circuit of FIG. 1.

DETAILED DESCRIPTION OF THE ILLUSTRATED EMBODIMENT

In the diagram of FIG. 1, a power supply is designated by the numeral 10. This power supply may be of any appropriate type, and usually serves to convert alternating current from the usual mains into a direct current output across output terminals 12.

A direct current cooling fan 14 is provided, and is energized by the direct current output of the power supply. An isolation circuit 16 is provided for the fan 14, and the isolation circuit serves to prevent the operation of the fan from introducing noise signals across the output terminals 12. As shown in FIG. 1, the positive output terminals is directly connected to the positive terminal of fan 14, and is also connected to a capacitor C148 and to a 2 kilo-ohm resistor R102. Capacitor C148 is a 78 microfarad 100 volt electrolytic capacitor. The capacitor C148 is connected to the collector of an NPN transistor Q128 and to the negative terminal of the fan 14. Accordingly, the fan is respectively connected across the capacitor C148.

Transistor Q128 may be of the type designated MJE15030. Resistor R102 is connected to the base of transistor Q128 and also to a shunt regulator CR130 which may be of the type designated TL430. The regulator CR130 is shunted by a 0.1 microfarad capacitor C160, both of which are connected back to the negative output of power supply 10. Capacitor 160 serves to prevent high frequency oscillation in the circuit.

The emitter of transistor Q128 is also connected to the negative output of the power supply through a 13 ohm resistor R177, and through a 100 ohm potentiometer R103 and 100 ohm resistor R104. The movable contact of potentiometer R103 is connected to the regulator CR130.

The transistor Q128 serves as a constant current source, and it supplies a constant current to the parallel combination of the fan 14 and capacitor C148.

The direct current motor of fan 14, because of its nature, draws current with substantial pulses superimposed on the average current, as shown in the curve of FIG. 2, and these pulses can cause noise problems on the direct current bus, as explained above.

By supplying the fan motor of fan 14 from a constant current source, as is the case in the circuit shown in FIG. 1, the current drawn by the fan will not reflect pulses on the direct current bus, because of the inherent nature of the constant current source provided by transistor Q128.

The capacitor C148 which is in parallel with the fan motor, provides a path in which the current pulses drawn by the fan motor may circulate. However, the fan draws a constant current from the direct current power supply. This constant current is established by the regulator CR130 which controls the base voltage of transistor Q128.

The bias current for the shunt regulator CR130 is provided through the resistor R102. The current through the transistor Q128 develops the voltage across resistor R177 and the parallel series combination of resistor R104 and potentiometer R103. This voltage is divided through a variable divider formed by resistor R104 and potentiometer R103 and applied to the control terminal of the shunt regulator CR130.

Accordingly, if the current drawn by the fan motor tends to increase, the voltage across resistor R104 and potentiometer R103 will increase raising the voltage of the control element of the shunt regulator CR130 causing its conductivity to increase. This results in a reduction of the base voltage of transistor Q128 thereby reducing the current flow through the transistor. Adversely, if the current drawn by the fan motor decreases, the current flow through transistor Q128 tends to increase.

Accordingly, the network regulates the current through transistor Q128 providing a constant current to the combination of fan motor and capacitor C148. This current may be adjusted by adjusting the potentiometer R103 which changes the division ratio of the variable divider.

Accordingly, the isolation circuit of FIG. 1 prevents periodic current surges developed by the direct current motor of the fan 14 from appearing as noise on the direct current buses from power supply 10.

It will be appreciated that while a particular embodiment of the circuit and system of the invention has been shown and described, modifications may be made. It is intended in the claims to cover all modifications which come within the true spirit and scope of the invention.

I claim:

1. In combination: a power supply having first and second terminals for establishing a direct current output voltage across a direct current bus; a direct current electric fan having first and second terminals for cooling the power supply with the first terminal of the fan being connected to the first terminal of the power supply; and a regulator circuit connecting the second terminal of the power supply to the second terminal of the fan for energizing the fan and establishing an essentially constant current drain from the power supply in the presence of periodic surges in the current drawn by the fan to prevent the creation of noise signals across the direction current bus, said regulator circuit including a capacitor connected across the first and second terminals of said fan to form a low impedance circulating path for said periodic surges, and said regulator circuit further including a network connected to the parallel combination of said fan and said capacitor and forming a constant current providing a constant current to said parallel combination.

2. The combination defined in claim 1, in which the power supply has a positive output terminal and a negative output terminal; and in which said network includes a transistor having a base electrode, an emitter electrode and a collector electrode; in which said capacitor is connected to said positive output terminal and to said collector electrode; which includes first resistor means connecting the emitter electrode to said negative output teminal; and which includes second resistor means connecting said base electrode to said positive output terminal.

3. The combination defined in claim 2, and which includes a shunt regulator connected to said base electrode and to the negative output terminal.

4. The combination defined in claim 3, and which includes a variable voltage divider connecting said emitter electrode to said negative output terminal, and having a movable contact connected to said shunt regulator to establish the average current drawn by the motor.

* * * * *